May 31, 1966 C. L. BENNETT 3,254,214
READOUT APPARATUS FOR CONTINUOUSLY DETERMINING CONCENTRATION
OF RADIATION ATTENUATING SUBSTANCES
IN A FLOWING STREAM
Filed March 26, 1962 2 Sheets-Sheet 1

INVENTOR.
CLARENCE L. BENNETT
BY

United States Patent Office 3,254,214
Patented May 31, 1966

3,254,214
READOUT APPARATUS FOR CONTINUOUSLY DE-
TERMINING CONCENTRATION OF RADIATION
ATTENUATING SUBSTANCES IN A FLOWING
STREAM
Clarence L. Bennett, Ponca City, Okla., assignor to Continental Oil Company, Ponca City, Okla., a corporation of Oklahoma
Filed Mar. 26, 1962, Ser. No. 182,319
4 Claims. (Cl. 250—43.5)

The present invention relates to electrical apparatus for determining the concentration of a substance in a continuously flowing stream by measuring the extent to which a source of radiation directed through the stream, or a sample thereof, is attenuated. More specifically, but not by way of limitation, this invention relates to electrical apparatus for determining the concentration of aluminum in a flowing hydrocarbon stream.

In the copending applications for U.S. Letters Patent Serial Nos. 165,852 and 165,853, filed on January 12, 1962, and assigned to the assignee of the present invention, a novel and highly useful process and an apparatus, respectively, for determining the concentration of aluminum in hydrocarbon fluid streams are described. Basically, the process described in the cited applications comprises subjecting a sample taken from the fluid stream to the impingement of certain types of radioactive emanations and determining the extent to which the radio-active emanations are attenuated while passing through the sample by aluminum in the sample which blocks or absorbs a portion of the radiations. The preferred source of such emanations is indicated in said applications to be ten millicuries of an iron 55 radioisotope which emits X-rays having an effective wave length of about 2.05 A. The principle underlying the process is given as that of employing soft X-rays of a wave length such that the other materials, primarily hydrocarbon, which are included in the hydrocarbon stream do not substantially attenuate the transmission of the soft X-rays through a sample of the flowing stream, while any aluminum, whether in bound or free form, which may be in the stream will absorb X-rays of the selected wave length, and thus attenuate or block to some extent their passage through the sample. The extent of attenuation or decrease in intensity of the X-ray radiation which does pass through the sample is thus directly related to the amount or concentration of aluminum in the hydrocarbon stream. Therefore, if a sample is continuously taken from the process stream and passed through a sample cell where it is subjected to impingement by the soft X-rays, the concentration of aluminum in the process stream can be continuously determined by continuously measuring the extent to which the source of X-rays is attenuated.

The present invention is concerned with the continuous measurement of the attenuation of the beam of X-rays passing through the sample cell and to the problems associated with converting the detected degree of attenuation to useful data which is indicative of the percent concentration of the attenuating substance in the sample fluid.

Devices for measuring the intensity of various types of radiation are well known in the art. One of the best known devices for sensing radiation is the Geiger-Mueller tube. The Geiger-Mueller tube emits an electrical impulse for each particle of radiation or X-ray which enters the tube. The well-known Geiger counter is comprised primarily of a Geiger-Mueller tube and a rate count circuit for converting the number of electrical pulses from the Geiger-Mueller tube per unit time to a D.C. voltage having a magnitude proportional to the pulses per unit time generated in the tube. Of course, the electrical pulses per unit time can then be indicated visually merely by a voltmeter or ammeter having the face appropriately calibrated in counts per minute or counts per second. Calibration of the Geiger counter type radiation meter is relatively simple because the range of the meter remains constant over a span from zero radiation to the capacity of the meter, although in the more sophisticated meters, the readout face of the meter is alternatively calibrated in counts per minute or counts per second, and the desired calibration can be selected by a manual switch.

However when the extent of attenuation of a source of radiation is being measured, rather than merely the absolute level of radiation intensity, in order to measure the concentration of a radiation attenuating substance in the fluid stream, as in the present invention, some means must be provided for properly calibrating the readout signal for use on a recorder or other device which indicates percent concentration of the attenuating substances. For example, some unknown level of radiation may pass through the fluid sample when the concentration of the radiation attenuating substance is four percent. Then as the concentration of the attenuating substance increases to five percent, the level of radiation will decrease by some unknown amount. It will be evident that the only means by which the level of radiation for any given concentration of attenuating substance can be determined is by calibration runs wherein a fluid having a known concentration of the attenuating substance is passed through the apparatus. Since the span of the scales of most readout meters or recorders is limited, some means must be provided for adjusting or calibrating the meter, recorder or other readout device to correspond to the actual percent concentration of the attenuating substance in the sample fluid. Also, the sensitivity of the readout device must be adjustable, without appreciably affecting the basic calibration of the meter, because frequently it will be desired to accurately measure changes of less than one percent in the concentration of the attenuating substance, which will necessitate accurate measurement of a relatively minor variation in the attenuation of the source of radiation. At other times it may be desirable to indicate or record changes in concentration over a much greater percentage range.

Therefore in accordance with the broader aspects of the present invention, an electrical apparatus is provided for continuously determining the concentration of a radiation attenuating substance in a flowing stream at least a portion of which is directed through a sample cell through which a source of radiation is directed. The electrical apparatus generally comprises sensing means for detecting the intensity of the radiation passing through the sample cell and therefore through the portion of the flowing stream therein, a measurement resistor, circuit means connected to the sensing means and to the measurement resistor for applying a D.C. potential across the measurement resistor proportional to the intensity of the radiation detected by the sensing means, calibration circuit means connected to apply a variable D.C. potential in opposition to the D.C. potential from said circuit means for adjusting the potential applied to the measurement resistor to a desired valve, and sensitivity circuit means for selecting a proportionate part of the D.C. potential applied to the measurement resistor and for applying the proportionate part of the potential selected to a readout device.

Therefore it is an important object of the present inventon to provide an improved electrical apparatus for determining the concentration of a radiation attenuating substance in a flowing stream.

Another object of the present invention is to provide an apparatus for the type described having a novel calibration circuit by which any level of radiation, and therefore any concentration of radiation attenuating substance, can be used as the zero reading on a readout meter or recorder.

Still another object of this invention is the provision of an apparatus of the type described which has an infinite number of sensitivity settings within the design limits of the apparatus.

Another important object of the present invention is to provide an apparatus of the type described in which adjustments of the infinitely variable sensitivity control does not appreciably affect the adjustment of the zero calibration control.

Yet another object of this invention is to provide an improved measurement circuit which produces a sufficiently stable D.C. potential which is proportional to the concentration of the radiation attenuating substance being measured so as to permit great sensitivity and detection of relatively minor changes in the concentration.

Many additional objects and advantages of the present invention will be obvious to those skilled in the art from a reading of the following specification and perusal of the accompanying drawings wherein.

Figure 1:
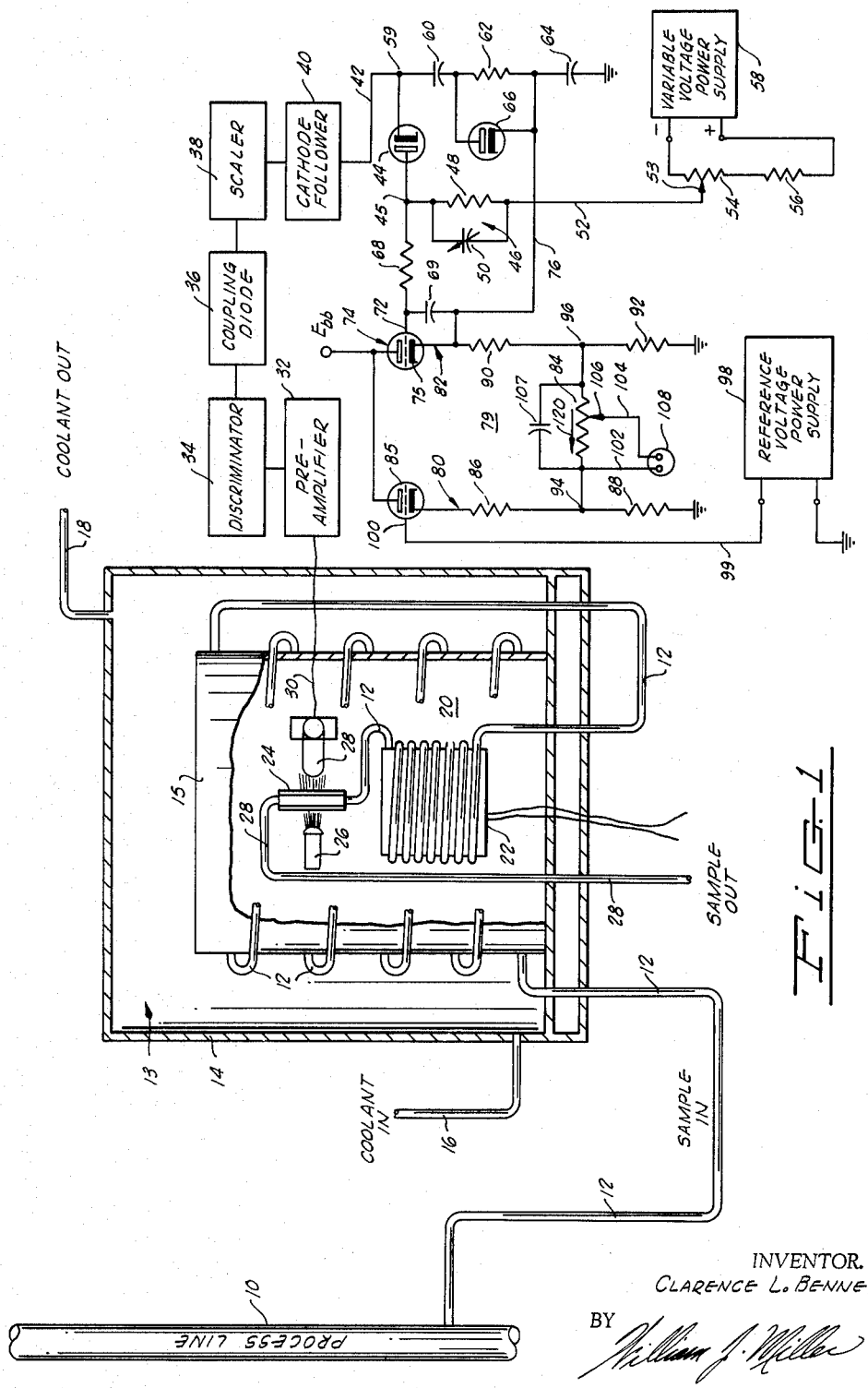
FIG. 1 is a schematic diagram of an electrical circuit apparatus in accordance with the present invention and also of apparatus for passing a sample of fluid through a sample measuring cell under uniform measurement conditions.

Referring now to the drawings, and in particular to FIG. 1, a conduit 10 represents some conduit through which a fluid stream containing some unknown concentration of a radiation attenuating substance is passing, which concentration it is desired to know. The fluid stream may be, for example, a hydrocarbon stream and the radiation attenuating substance may be aluminum. A sample of the fluid stream in the conduit 10 is continuously drawn off through a sample line 12. The sample line 12 passes through a cooling chamber, indicated generally by the reference numeral 13, where the sample fluid is cooled to a temperature lower than a desired measuring temperature. The cooling chamber 13 may comprise any suitably insulated fluid housing, but as shown is formed by an outer housing 14 and an inner housing 15. A cooling fluid is introduced through an inlet 16 and withdrawn through an outlet 18. The sample line 12 describes a series of convolutions around the inner housing 15 to assure that the sample fluid is reduced substantially to the temperature of the coolant liquid within the cooling chamber 13. The sample line then passes from the cooling chamber 13 into a heating chamber 20 where it describes a series of convolutions around an isothermal block 22. The isothermal block 22 is maintained at a constant temperature by a suitable automatically controlled heater and effectively maintains the entire heating chamber 20 at a constant temperature so that the sample in the line 12 is heated to the desired measurement temperature of the isothermal block 22 preparatory to introduction to a sample cell 24.

The sample cell 24 is so constructed as to permit soft X-rays from a radiation source 26, preferably of the type described in our copending applications and referred to above, to pass through the sample cell without appreciable attenuation of the intensity of the radiation source. A conventional Geiger-Mueller tube 28 or other suitable radiation sensing device, is disposed opposite the radiation source 26 to detect the intensity of the radiation passing through the sample cell 24. The sample fluid then passes out through the conduit 28. Of course, the pressure of the sample fluid in the sample cell 24 is preferably maintained at a constant value to insure that the sample fluid is always measured under the same conditions of temperature and pressure.

Assume now that the sample directed through the sample cell 24 contains only one substance which will, to any appreciable extent, absorb the particular soft X-rays of the specified wave length emitted from the radiation source 26. In such a case, the degree of attenuation or reduction in intensity of the radiation source 26 as the emitted X-rays pass through the sample cell 24 will be proportional to the concentration or percent by volume or weight, as is applicable, of the radiation attenuating substance, such as aluminum, in the sample fluid. In the particular process described, each soft X-ray that enters the Geiger-Mueller tube 28 produces a single electrical pulse of approximately five volts intensity at the lead 30. The number of pulses generated per unit time period is therefore a measure of the intensity or level of radiation which has passed through the sample cell 24 and the sample fluid passing through the cell.

The signal from the Geiger-Mueller tube 28 is fed to a pre-amplifier 32. The pre-amplifier 32 may be of any conventional type and is provided because the sampling apparatus and Geiger-Mueller tube 28 may be several hundred feet from the remainder of the circuitry to be hereafter described. Of course, the pre-amplifier 32 is preferably located in close proximity to the sampling apparatus. The amplified signal from the pre-amplifier 32 is then connected to a conventional discriminator circuit 34. The discriminator circuit 34 may be any conventional circuitry which functions to eliminate random noise and low energy signals. The discriminator circuit 34 accepts only pulse signals of such intensity as to have been almost assuredly generated by impingement of an X-ray in the Geiger-Mueller tube 28 and shapes each accepted pulse signal to produce a pulse of uniform magnitude and duration.

The output from the discriminator 34 is connected by a coupling diode 36 to a scaler circuit 38. The coupling diode 36 functions in the conventional manner and is connected to pass only negative pulses from the discriminator. The scaler 38 is provided merely to increase the intensity of the pulse signals to a desired value, without appreciably distorting the signals. In this connection, it will be appreciated that the pulse signals emanating from the scaler as a result of the discriminator 34, the coupling diode 36, and the scaler 38 must be of uniform intensity and duration, with one pulse for each X-ray received in the Geiger-Mueller tube 28. The output from the scaler 38 is then fed to a cathode follower 40 which is provided to match the impedances of the circuits in the conventional manner.

The cathode follower is connected by a conductor 42 to a diode 44 and then through junction 45 to an R.C. (resistor-capacitor) circuit, indicated generally by the reference numeral 46, comprised of a resistor 48 and capacitor 50. A conductor 52 connects the R.C. circuit to the sliding contact 53 of a rheostat 54. The rheostat 54, together with a resistor 56 is connected across a D.C. power supply 58.

The conductor 42 is also connected through junction 59 to a capacitor 60, a very large resistor 62, and a capacitor 64 and then to the ground. A diode 66 is connected around the resistor 62 to provide substantially a short circuit to any random positive pulses which might be applied by the cathode follower 40 to the conductor 42.

A resistor 68 connects the junction 45 to the grid 72 of a triode 74 which will hereafter be described in greater detail. A capacitor 69 is connected between the grid 72 and the cathode 75 of the triode 74. A conductor 76 is connected between junctions 77 and 78.

A measurement bridge, indicated generally by the reference numeral 79, is comprised of two substantially identical circuits, reference circuit 80 and varying circuit 82, and a measuring resistor 84. The reference circuit 80 is comprised of triode 85, resistor 86 and resistor 88 which are connected between a source of constant potential $E_{bb}$ and ground. Similarly, the varying circuit 82 is comprised of the triode 74, a resistor 90, and a resistor 92 also connected between the source of potential $E_{bb}$ and ground. Triodes 85 and 74 are preferably identical, and resistors 86 and 90 preferably have the same resistance value as do resistors 88 and 92. Therefore, the measuring resistor 84, which is connected between junctions 94 and 96, is connected between points of equal potential when equal currents are flowing in the two circuits 80 and 82. A stable reference voltage power supply 98 is connected by conductor 99 to supply a stable bias to the grid 100 of the triode 85 and thereby establish a stable reference current through the reference circuit 80.

The measuring resistor 84 is a variable resistor or rheostat, and a circuit for selecting any proportion of the total voltage drop across the measuring resistor 84 is comprised of a conductor 102, which is connected to one terminal of the measuring resistor or rheostat 84, and a conductor 104, which is connected to the sliding contact 106 of the rheostat 84. The conductors 102 and 104 are then connected to a recorder 108, or similar readout device, and to a servomechanism if desired. A capacitor 107 is connected across the measuring resistor or rheostat 84 for smoothing the current through the resistor 84 for purposes hereafter described in greater detail.

Figure 2:
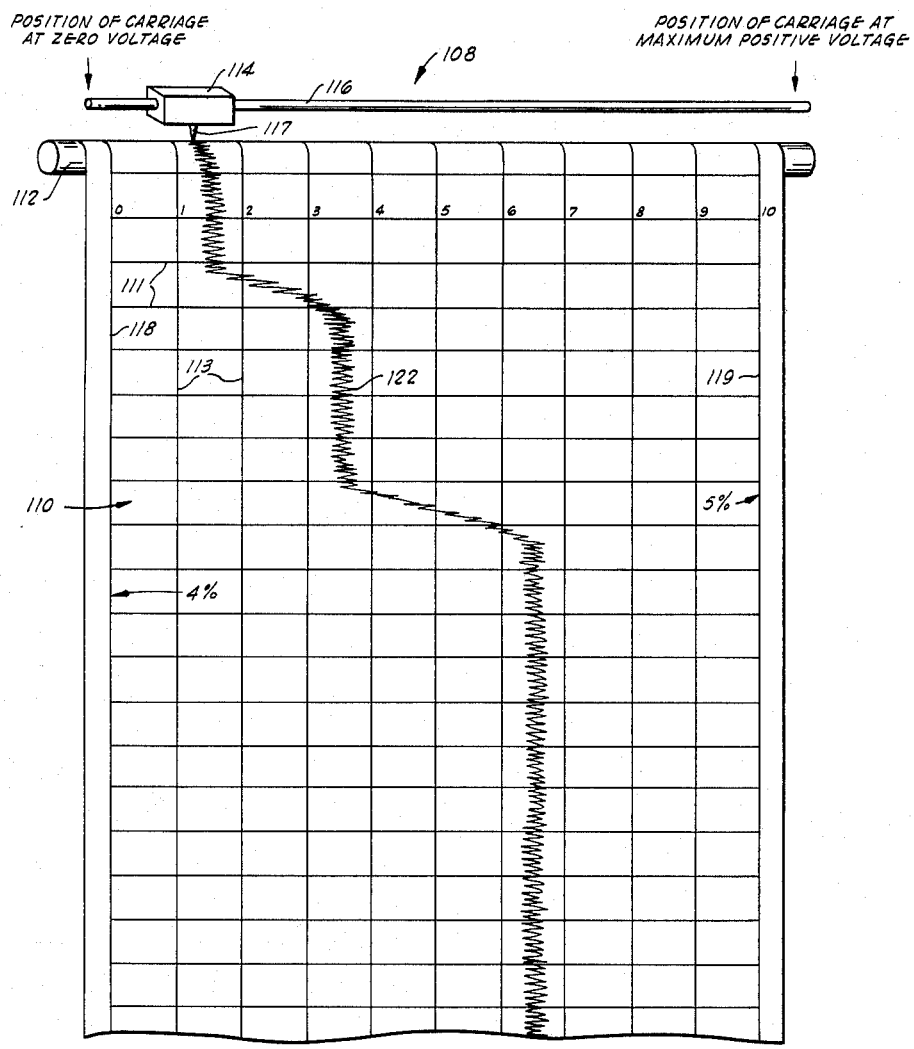
FIG. 2 is a schematic diagram of a recording device and serves to illustrate the operation of the present invention.

The recorder 108 may be any typical recorder utilized for continuously recording data which is represented by the magnitude of an electrical signal, and a conventional recorder 108 is schematically represented in FIG. 2. An elongated record sheet 110 is driven at a constant rate across a roller 112 in such a manner that the longitudinal dimension on the record sheet represents elapsed time since initiation of the recording, and the record sheet may conveniently be provided with transverse time lines 111. The record sheet 110 is preferably of the pressure sensitive type which when contacted by a scriber produces a visible line. The record sheet 110 has a fixed, uniform width, such as ten inches, and is preferably provided with longitudinally extending, uniformly spaced reference lines 113 which assist in determining the true value of the data being plotted on the record paper as hereafter described in greater detail.

Many different mechanisms have been devised for scribing the data line on the record paper 110 at the proper transverse position on the paper as determined by the electrical signal applied to the recorder, and it will be sufficient for purposes of this invention merely to represent such a mechanism by a scribing carriage 114 which travels transversely of the record paper 110 on a suitable track or rail 116 and has a scribing point 117 which engages the record paper 110. The scribing carriage 114 is positioned at the left margin of the record paper when no electrical signal or zero potential is applied to the recorder 108 and moves uniformly along the rail 116 transversely to the record sheet 110 as the magnitude of the electrical signal increases until the scribing carriage reaches the right hand margin of the record sheet at some predetermined maximum voltage of the signal, depending upon the design of the particular recording apparatus.

OPERATION

In operation, a fluid sample is continuously taken from the conduit 10 and passed through the sample conduit 12. The sample fluid in conduit 12 is first cooled by passage through the cooling chamber 13 and then heated by the isothermal block 22 to a standard measurement temperature. The sample fluid is then passed through the sample cell 24. The radiation source 26 continuously emits X-rays at a substantially constant rate. The X-rays are attenuated to some degree as they pass through the sample cell 24 by the attenuating substance, such as aluminum, which may be in the sample fluid in the sample cell 24.

The intensity of the radiation passing through the sample cell 24 and sample fluid therein is then continuously detected by the Geiger-Mueller tube 28. A single electrical pulse is transmitted to the preamplifier 32 for each X-ray entering the Geiger-Mueller tube 28. The discriminator 34 then produces a single pulse of a uniform size and duration for each of the pulses generated by the Geiger-Mueller tube. The pulses from the discriminator pass through the coupling diode 36 and are increased to the desired magnitude by the scaler 38.

The cathode follower 40 is connected in the conventional manner so that primarily only the negative pulses are applied to the diode 44 which assures that only negative pulses are passed to the remainder of the circuit. More specifically, the conductor 42 is connected to the cathode of a triode in the conventional manner so that when a negative pulse from the scaler 38 is imposed upon the grid of the triode, the cathode will follow and become similarly more negative. Therefore, a pulse of conventional positive current will flow from the positive terminal of the power supply 58 through the circuit comprised of the resistor 56, the variable resistor 54, the conductor 52, the resistor 48 of the R.C. circuit 46, junction 45, diode 44 ant conductor 42 to the cathode follower 40. The effect of the R.C. circuit 46 is to smooth the flow of pulses through the circuit just described and produce a relatively stable potential at the junction 45. Or, stated in terms of negative pulses, the greater the number of uniform negative pulses which are applied to the grid of the cathode follower, the greater the number of negative pulses which pass through the diode 44, and the more charged the capacitor 50 will become. The resulting increased current through the diode 44 as the capacitor discharges through resistor 48 causes the junction 45 to become more negative. The negative potential of junction 45 is applied through resistor 68 to the grid 72 of the triode 74 so that as the junction 45 becomes more negative, the current through the triode 74 will be decreased. Thus it will be seen that the current through the circuit 82 is decreased in proportion to the increase in radiation received by the Geiger-Mueller tube 28, and therefore, the current through the circuit 82 decreases as the percentage of the radiation attenuating substance in the sample cell 24 decreases.

As mentioned, the current through the reference circuit 80 is stabilized by the reference voltage power supply which is applied to the grid 100 of the triode 85. Therefore, as the percentage concentration of the attenuating substance in the fluid sample decreases, and the current in circuit 82 correspondingly decreases, conventional positive current through the measuring resistor 84, arbitrarily chosen as positive when in the direction of arrow 120, will decrease with a resulting decrease in voltage drop between junctions 94 and 96. As a result, it will be noted that the conventional current, indicated as positive current by the arrow 120, through the measuring resistor 84 varies directly as the percentage of radiation attenuating substance in the sample cell 24. As previously mentioned, the scribing carriage 114 is at the left hand edge of the record sheet 110 when no signal or potential is applied to the recorder 108, and is at the right hand edge of the record sheet 110 when a maximum positive potential is applied to the recorder. Therefore it is desirable that the current through the circuit 82 be greater than or equal to the current through the reference circuit 80 at all times so that the current through the measurement resistor 84 will be positive and properly operate the recorder 108. In summary, it will be noted that as the percentage concentration of the attenuating substance in the sample fluid increases, the radiation reaching the Geiger-Mueller tube 28 decreases, the number of signal pulses to the cathode follower 40 decreases, the current through the diode 44 decreases, the potential of junction 45 and therefore grid 72 increases, the current through the circuit 82 increases, the current through the measurement resistor 84 increases, the magnitude of the potential applied to the recorder 108 increases and the scribing carriage 114 will move to the right transversely across the record sheet 110 so that increasing concentrations of the attenuating substance will be indicated from left to right in the conventional manner.

As previously mentioned, the degree of attenuation of a source of radiation is being measured, rather than the absolute level of radiation, and the degree of attenuation indicated on the record sheet 110 must be equated or calibrated to indicate the percent concentration of the attenuating substance in the sample fluid passing through the sample cell 24. Also, in order for the recorder 108 to have maximum sensitivity the full range or span of the recorder must be utilized. In other words, assuming that a range of concentrations of the attenuating substance between four percent to five percent are to be measured with maximum sensitivity, it would be necessary that the scribing carriage be at the left hand side or read zero when a four percent concentration flows through the sample cell, and be at the right hand side or read ten when a five percent concentration fluid is passing through the sample cell. In this case each vertical line would represent 0.1 percent concentration of the attenuating substance. At other times, it may be desired to record concentrations varying between, for example, five percent and twenty-five percent, in which case each vertical line would represent two percent concentration.

The apparatus is calibrated by two or more calibration runs in which sample solutions of known concentration are passed through the sample cell. Assuming that the apparatus is to be calibrated to record concentrations between four and five percent. A solution having a four percent concentration is carefully measured to the greatest possible accuracy and passed through the sample cell. After stable conditions have been reached, the sliding contact 53 is adjusted, together with the variable voltage 58 if required, until the potential of the junction 45 and therefore of the grid 72 is such that the current through the circuit 82 is equal to the current through the reference circuit 80 and substantially no current passes through the measurement resistor 84. The scribing carriage 114 will then be at the left hand side of the record sheet 110 in such a position that the scribing point 117 will contact the record sheet at the zero vertical line 118. As a practical matter, however, some indication must be obtained on the record sheet to assure that the current through the circuit 82 has not been reduced substantially below the current in the reference circuit 80. Usually the normal fluctuations in the current caused by the random nature of the signals produced by the Geiger-Mueller tube as a result of the radiation, which is random, will produce peaks which will cause actuation of the recorder even though the average position of the scribing point 117 is at zero.

Next, a sample fluid having a five percent concentration is passed through the sample cell 24. After the circuit has reached a stabilization point, the sliding contact 106 is adjusted until the scribing carriage 114 moves to the right hand edge of the record sheet and the scribing point 117 is scribing a line on the right hand vertical reference line 119. Calibration of the apparatus is then completed and concentrations between four and five percent will be indicated on the record sheet 110. When conditions change which warrant recalibration, such as a decay or decrease in the intensity of the radiation source, a change in the constituents in the sample stream, or a change in the concentration of the radiation attenuating substance which is to be measured, the calibration procedure must then be repeated.

It will be noted that the calibration or zero setting of the apparatus by the adjustment of the sliding contact 53 in effect opposes the decrease in potential of the junction 45 caused by the negative pulses from the scaler 38 to the cathode follower 40. It will also be noted that adjustment of the sliding contact 53 which may be termed the "zero control" does not appreciably affect operation of the "sensitivity control" adjustment which is the sliding contact 106. Once a span of one percent concentration, for example, is established by the sensitivity control, it will remain valid for most zero settings. Conversely, once the zero control is adjusted by the sliding contact 53 to orient the four percent concentration at the left hand edge or zero position on the record sheet 110, the sensitivity or span control sliding contact 106 can be adjusted to change the range of concentration recordable from one percent to ten percent, for example, without appreciably affecting the zero calibration. It will further be evident that in order to detect such slight attenuations of the radiation source 26 as would represent a change of only one percent concentration of the radiation source 26 as would represent a change of only one percent concentration of the attenuating substance, the signal from the R.C. circuit 46, as applied to the grid 72, must be amplified to such an extent that the normal variations in the signal would produce an excessively waving graph or data line 122 on the record sheet 110. Therefore, capacitors 69, 64 and 110 smooth and stabilize the potential across the measurement resistor 84 to an extent sufficient that the random variations in the data line are reduced to a minimum, even at maximum sensitivity settings of the sliding contact 106.

From the above detailed description of a preferred embodiment of the present invention, it will be evident that a novel and highly useful circuit apparatus for determining the concentration of a radiation attenuating substance in a flowing stream has been described. However, it is to be understood that various changes and substitutions can be made therein without departing from the spirit and scope of the invention as defined by the appended claims.

What is claimed is:

1. Apparatus for continuously determining the concentration of a radiation attenuating substance in a flowing stream a portion of which is directed through a sample cell under stabilized measurement conditions comprising:

an electrical measurement bridge having first and second balanced circuits and a measuring resistor connected at first and second junctions, respectively, between the first and second balanced circuits, the first and second junctions being such that equal currents through the first and second circuits will result in no current through the measuring resistor and unequal currents will result in a current through the measuring resistor proportional to the difference in the currents, the current through the measuring resistor causing a corresponding voltage drop thereacross;

means for establishing a reference current through the first circuit;

control means for varying the current through the second circuit in proportion to a potential applied to the control means;

a source of radiation directed through the sample cell;

detection means for detecting the radiation passing through the sample cell and producing an electrical impulse each time a particle of radiation is detected;

converter circuit means connected to the detection means for converting the electrical impulses therefrom to a D.C. potential proportional to the impulses per unit time produced by the detection means;

a continuously adjustable source of potential connected to be combined with the D.C. potential produced by the converter circuit to produce a selectably variable combined potential which also varies in relation to the intensity of the radiation passing through the sample cell;

circuit means connecting the combined potential to the control means whereby the current through the second circuit will be varied proportionally to the variations in the combined potential;

and circuit means for selecting any proportional part of the voltage drop across the measurement resistor and applying the potential to a readout device.

2. Apparatus for continuously determining the concentration of a radiation attenuating substance in a flowing stream as defined in claim 1 wherein:
the first and second balanced circuits are connected across a common source of potential;
first and second triodes for controlling the current through the first and second balanced circuits, respectively;
a stable reference potential connected to the grid of the first triode to establish a reference current through the first balanced circuit;
and the combined potential from the converter circuit and the continuously adjustable source of potential is connected to the grid of the second triode for controlling the current through the second balanced circuit.

3. Apparatus for continuously determining the concentration of a radiation attenuating substance in a flowing stream as defined in claim 1 wherein:
the circuit means for selecting any proportional part of the voltage drop across the measurement resistor and the measurement resistor comprise a voltage divider with the selected potential being taken between one fixed contact and the movable contact.

4. Apparatus for continuously determining the concentration of a radiation attenuating substance in a flowing stream as defined in claim 3 further characterized by:
a capacitor connected between the grid and the cathode of the second triode for smoothing the response of the second triode; and
a capacitor connected across the entire resistor of the voltage divider.

References Cited by the Examiner
UNITED STATES PATENTS

| | | | |
|---|---|---|---|
| 2,824,236 | 2/1958 | Swift | 250—83 |
| 2,937,275 | 5/1960 | Thourson. | |
| 2,955,206 | 10/1960 | Spergel | 250—83.6 |
| 3,144,559 | 8/1964 | Forrester | 250—43.5 |

OTHER REFERENCES

Gamma Density Controls Extraction Column, by Rye, Chemical Engineering Progress, November 1957, pages 551 to 555.

RALPH G. NILSON, *Primary Examiner.*

J. W. LAWRENCE, *Assistant Examiner.*